(12) United States Patent
Lawton et al.

(10) Patent No.: US 7,935,280 B2
(45) Date of Patent: May 3, 2011

(54) CORE LOCKING ASSEMBLY AND METHOD FOR ORIENTATION OF ASYMMETRIC TOOLING

(76) Inventors: Bruce E. Lawton, Rochester, NY (US); Daniel P. Barrows, Rochester, NY (US)

( * ) Notice: Subject to any disclaimer, the term of this patent is extended or adjusted under 35 U.S.C. 154(b) by 0 days.

(21) Appl. No.: 12/512,293

(22) Filed: Jul. 30, 2009

(65) Prior Publication Data

US 2009/0289383 A1 Nov. 26, 2009

Related U.S. Application Data

(62) Division of application No. 11/027,381, filed on Dec. 30, 2004, now Pat. No. 7,585,167.

(51) Int. Cl.
*B29D 11/00* (2006.01)
(52) U.S. Cl. ....... 264/1.32; 164/340; 164/341; 164/397; 425/192 R; 425/468; 425/808
(58) Field of Classification Search .................. 264/1.32, 264/219; 425/190, 192 R, 193, 195, 547, 425/556, 595, 577, 408, 451.9, 467, 468, 425/808; 249/63, 175, 177, 182; 164/339–341, 164/397
See application file for complete search history.

(56) References Cited

U.S. PATENT DOCUMENTS

| | | |
|---|---|---|
| 2,066,936 A | 1/1937 | Jahraus |
| 2,433,013 A | 12/1947 | Ziegler |
| 2,516,373 A | 7/1950 | Ehlert et al. |
| 3,273,204 A | 9/1966 | Craddock |
| 3,304,586 A | 2/1967 | Buckminster et al. |
| 4,197,266 A | 4/1980 | Clark et al. |
| 4,208,364 A | 6/1980 | Shepherd |
| 4,217,043 A | 8/1980 | Momose et al. |
| 4,516,924 A | 5/1985 | Rawlings |
| 4,865,779 A | 9/1989 | Ihn et al. |
| 4,955,580 A | 9/1990 | Seden et al. |
| 5,110,278 A | 5/1992 | Tait et al. ................. 425/175 |
| 5,143,660 A | 9/1992 | Hamilton et al. |
| 5,271,875 A | 12/1993 | Appleton et al. |
| 5,415,817 A | 5/1995 | Shiao et al. |
| 5,466,147 A | 11/1995 | Appleton et al. |
| 5,512,221 A * | 4/1996 | Maus et al. ................. 264/2.5 |
| 5,601,759 A | 2/1997 | Apollonio |
| 5,733,585 A | 3/1998 | Vandewinckel et al. |
| 5,776,514 A | 7/1998 | Wu et al. ................. 425/144 |
| 5,792,392 A * | 8/1998 | Maus et al. ................. 264/2.5 |
| 5,861,114 A | 1/1999 | Roffman et al. |
| 5,968,422 A | 10/1999 | Kennedy |

(Continued)

*Primary Examiner* — Joseph S Del Sole
*Assistant Examiner* — Dimple Bodawala
(74) *Attorney, Agent, or Firm* — Glenn D. Smith

(57) ABSTRACT

An apparatus and method is provided for injection molding an ophthalmic lens mold section having an optical surface and a non-optical surface opposite the optical surface. The apparatus includes a non-optical tool assembly for forming the non-optical surface of the ophthalmic lens mold section. An optical tool assembly is in opposed relation to the non-optical tool assembly and together therewith forms a mold cavity for forming the ophthalmic lens mold section. In the preferred embodiment, the optical tool assembly includes a rotatably mounted core member and an optical insert removably secured the core member. The optical insert has an optical molding surface for forming an optical surface of the ophthalmic lens mold section opposite the non-optical surface thereof. A locking mechanism having, in a preferred embodiment, a locking pin selectively movable between a first position wherein the pin allows rotation of the core member and a second position wherein the pin prevents the core member from rotation.

18 Claims, 2 Drawing Sheets

U.S. PATENT DOCUMENTS

| | | |
|---|---|---|
| 6,305,661 B1 | 10/2001 | Kennedy |
| 6,428,723 B1 | 8/2002 | Lesczynski et al. |
| 6,638,362 B2 | 10/2003 | Dobner et al. |
| 7,431,580 B2 * | 10/2008 | Chiang .................. 425/190 |
| 7,585,167 B2 * | 9/2009 | Lawton et al. ............. 425/175 |
| 2003/0026865 A1 * | 2/2003 | Tumlin et al. ............. 425/141 |
| 2003/0113398 A1 | 6/2003 | Chiu et al. ............. 425/548 |
| 2006/0145369 A1 * | 7/2006 | Lawton et al. ............. 264/1.32 |
| 2006/0145370 A1 * | 7/2006 | Lawton et al. ............. 264/1.32 |
| 2006/0145371 A1 * | 7/2006 | Lawton et al. ............. 264/1.32 |
| 2006/0145372 A1 * | 7/2006 | Jones et al. ............. 264/1.32 |
| 2007/0013091 A1 | 1/2007 | Freson et al. ............. 264/1.32 |
| 2007/0138670 A1 * | 6/2007 | Beebe et al. ............. 264/2.6 |

* cited by examiner

CORE LOCKING ASSEMBLY AND METHOD FOR ORIENTATION OF ASYMMETRIC TOOLING

RELATED APPLICATION

This application is a DIV of application Ser. No. 11/027,381, filed Dec. 30, 2004, now U.S. Pat. No. 7,585,167.

BACKGROUND

The present disclosure relates to the molding of articles of manufacture. More particularly, the disclosure relates to an improved core locking assembly that enables injection molding tooling to be selectively oriented and secured for injection molding preforms or sections used in the manufacture of ophthalmic lenses, such as contact lenses and intraocular lenses. The improved core locking assembly is particularly applicable to asymmetric tooling used for injection molding preforms that are ultimately used in forming asymmetric ophthalmic lenses, such as toric contact lenses, and will be described with particular reference thereto. It is to be appreciated, however, that the improved core locking assembly and apparatus related thereto may have utility in a variety of other similar environments and applications.

One method in practice for making ophthalmic lenses, including contact lenses and intraocular lenses, is cast molding. Cast molding of ophthalmic lenses involves depositing a curable mixture of polymerizable lens materials, such as monomers, in a mold cavity formed by two assembled mold sections, curing the mixture, disassembling the mold sections and removing the molded lens. Other post-molding processing steps, for example, hydration in the case of hydrogel lenses, may also be employed. Representative cast molding methods are disclosed in U.S. Pat. Nos. 5,271,875 (Appleton et al.); 4,197,266 (Clark et al.); 4,208,364 (Shepherd); 4,865,779 (Ihn et al.); 4,955,580 (Seden et al.); 5,466,147 (Appleton et al.); and 5,143,660 (Hamilton et al.).

When cast molding between a pair of mold sections, typically one mold section, referred to as the anterior mold section or preform, forms the anterior convex, optical surface of the ophthalmic lens and the other mold section, referred to as the posterior mold section or preform, forms the posterior concave, optical surface of the ophthalmic lens. The anterior and posterior mold sections are generally complimentary in configuration. They are joined together during the molding process to form a lens forming or molding cavity. Once the lens is formed, the mold sections or preforms are separated and the molded lens is removed. The anterior and posterior mold sections are usually used only once for casting a lens prior to being discarded due to the significant degradation of the optical surfaces of the mold sections that often occurs during a single casting operation.

Formation of the mold sections used in casting occurs through a separate molding process prior to cast molding. In this regard, the mold sections are first formed by injection molding a resin in the cavity of an injection molding apparatus. More particularly, mounted in the injection molding apparatus are tools for forming the mold sections. Typically, the tools are fitted into mold plates in the injection molding machine and the mold sections are produced by injection molding a selected resin between opposed sets of injection molding tools. The tools are typically made from brass, stainless steel, nickel, or some combination thereof and, unlike the mold sections which are used only once, the injection molding tools are used again and again to make large quantities of mold sections.

The injection molding tools are typically formed in accordance with the specification of corresponding ophthalmic lens surfaces to be formed on or by the mold sections. That is, the ophthalmic lens being produced determines the specific design of the mold sections. The needed mold section parameters, in turn, determine the design of the corresponding injection molding tools. Thus, for example, when producing an ophthalmic lens having at least one asymmetric surface, the mold sections and molding tools would include corresponding asymmetric mold surfaces. In any case, the injection molding tools are typically manufactured to extremely high specifications and/or tolerances so that no roughness or surface defects are transferred to the mold sections being made from the tools. Any such defects on the mold sections, particularly on an optical surface of a mold section, is likely to be transferred to, and appear on, the finished lens during the cast molding operation.

Each mold section, whether it be a posterior mold section or an anterior mold section, includes an optical surface (posterior optical surface on a posterior mold section and anterior optical surface on an anterior mold section) that forms a surface of the ophthalmic lens, as well as a non-optical surface. When injection molding the mold section, the injection molding apparatus typically includes an optical tool assembly for forming the optical surface of the mold section and a non-optical tool assembly for forming the non-optical surface of the mold section. When the lens to be formed includes an asymmetric surface, the mold section optical surface used to form the asymmetric lens surface and the optical tool assembly used to form the mold section optical surface each may include corresponding asymmetric surfaces.

One example of a lens having an asymmetric surface is a toric contact lens, which is sometimes employed for correcting an astigmatism of the cornea. Toric contact lenses often include a toric surface (i.e., an asymmetrical surface) defined along a toric axis and a ballast used to properly orient the toric axis over a corresponding astigmatism of one's cornea. Another example of an asymmetric lens is a multifocal contact lens. These and other types of asymmetric lenses can present unique manufacturing challenges, particularly as compared to spherical or symmetrical lenses, due to their inclusion of at least one rotationally asymmetric surface. One such problem can occur during set-up of the injection molding tools used to make the mold sections which are then subsequently used to form the asymmetric lenses.

For example, it has been found that during injection molding of mold sections having asymmetric surfaces, such as those used for forming toric contact lens, the flow dynamics of the fluid mold material (i.e., the molten resin used to form the mold sections) over the tooling assembly's molding surface varies depending on the orientation of the asymmetric molding surface relative to the flow direction of the fluid mold material emanating from the gate of the injection molding apparatus. This is particularly problematic when asymmetric mold sections are formed in a plurality of mold cavities, which occur in multi-cavity injection molding machines and/or among a plurality of injection molding machines. Asymmetric mold sections formed in different cavities can have varying optical surfaces formed as a result of the mold sections being formed in cavities each having a different rotational orientation between the asymmetric molding surface and the gate through which molten resin enters the mold cavity. These variations are ultimately transferred to the cast molded lenses causing the lenses, in some instances, to be scrapped.

Variations in the cast molded lenses can also occur in lenses formed from mold sections being injection molded from a single mold cavity. This could occur when the optical tool assembly of the injection molding apparatus is formed of multiple components. For example, the optical tool assembly could include an optical insert having the asymmetric optical molding surface thereon being removably secured, such as by threaded engagement, to a core member or optical tool holder. When the optical insert is removed and reattached (or replaced), rotational positioning of the optical insert relative to the core member is not likely to be the same as before removal, thus the rotational positioning relative to the gate is likely to be different. As a result, mold sections molded before removal of the optical insert are likely to have asymmetric surfaces that are different than those of mold sections molded after removal and replacement of the optical insert. It may furthermore be desirable to align the injection molding gate with any type of marking intentionally placed on the optical or non-optical part of the mold section. It may furthermore be desirable to align a particular feature or marking on one of the optical or non-optical tools or components thereof with a particular feature or marking on the opposing optical or non-optical tool or component thereof.

Prior improvements to optical tool assemblies have enabled a threadedly connected optical insert having an asymmetrical molding surface to be selectively and rotatably positionable relative to an injection molding gate. However, despite previous improvements, there is still a need for any additional improvements that more easily enable either one or both of the optical insert and non-optical insert to be selectively and rotatably positionable after installation of the non-optical or optical insert. By enabling quick selective rotation of either one or both of the optical and non-optical inserts, the set-up, i.e., the relative positioning of the inserts, particularly before and after the changing of inserts, is more consistent and controlled. This allows, for example, for the selective positioning of an asymmetric or other mold feature of one insert relative to the opposite tool insert and/or to an injection molding gate, for example. As a further example, parameters such as mold part thickness, which may change depending on the rotational positioning of the opposing inserts, may therefore be more precisely controlled. Thus, improvements that allow the non-optical and/or optical insert to be toggled between being rotatably fixed in a selected position and being rotatably movable to a selected rotational position are deemed desirable.

BRIEF SUMMARY

It is noted that although the preferred embodiment described herein associates the optical tool assembly with the selectively rotatable core member, it is understood that the rotatable core member and associated components thereof may additionally or alternatively be used on the non-optical tool side of the injection mold base.

Thus, according to one aspect, an apparatus and method is provided for injection molding an ophthalmic lens mold having an optical surface and a non-optical surface opposite the optical surface. More particularly, in accordance with this aspect, the apparatus includes a non-optical tool assembly for forming the non-optical surface of the ophthalmic lens mold and an optical tool assembly in opposed relation to the non-optical tool assembly that together therewith forms a mold cavity for forming the ophthalmic lens mold. The optical tool assembly includes a rotatably mounted core member and an optical insert removably secured to the core member. The optical insert has an optical molding surface for forming an optical surface of the ophthalmic lens mold section opposite the non-optical surface thereof. A locking mechanism has a locking pin selectively movable between a first position wherein the pin allows rotation of the core member and a second position wherein the pin prevents the core member from rotation.

According to another aspect, an injection molding apparatus is provided for forming a mold section which is subsequently used for forming an ophthalmic lens having an asymmetric surface. More particularly, in accordance with this aspect, the injection molding apparatus includes a core member rotatably mounted to an associated first mold plate. The core member includes a plurality of circumferentially spaced holes. An optical tool insert is removably mounted to the core member. The optical tool insert has an asymmetric molding surface with an optical quality finish for forming an optical surface of the mold section. A locking mechanism is mounted to the associated first mold plate and has a locking pin receivable in a selected one of the plurality of circumferentially spaced holes thereby allowing the core member with the optical insert mounted thereto to be rotated to a selected rotational position. A non-optical tool is mounted to an associated second mold plate opposite the associated first mold plate. The non-optical insert has a molding surface for forming a non-optical surface of the mold section opposite the optical surface. A water jacket surrounds the non-optical tool and is mounted to the associated second mold plate.

According to yet another aspect, an optical tool assembly is provided for use in an injection molding apparatus opposite a non-optical tool assembly to form an ophthalmic mold section. More particularly, in accordance with this aspect, the optical tool assembly includes a core member mounted to an associated mold plate of the injection molding apparatus. The core member has a cooling cavity fluidly connected to at least one associated fluid line of the injection molding apparatus. An optical insert is separate from the core member and removably secured thereto. The optical insert has an asymmetric optical molding surface for forming an optical surface of the ophthalmic mold section. A locking mechanism is mounted to the associated mold plate and has a locking pin receivable in a selected one of a plurality of circumferentially spaced holes defined in the core member to set and lock the rotational position of the core member.

According to still yet another aspect, an injection molding apparatus is provided for forming a mold section which is subsequently used for forming an ophthalmic lens. More particularly, in accordance with this aspect, the injection molding apparatus includes a non-optical tool assembly for forming the non-optical surface of the ophthalmic lens mold section. A rotatably mounted optical tool assembly is in opposed relation to the non-optical tool assembly. The non-optical tool assembly and the optical tool assembly together form a mold cavity for forming the ophthalmic lens mold section. The optical tool assembly includes an asymmetrical optical molding surface for forming an optical surface of the ophthalmic lens mold section opposite the non-optical surface thereof. A locking mechanism has a locking pin receivable in a selected one of a plurality of circumferentially spaced holes defined in the rotatably mounted optical tool assembly to set and lock the optical tool assembly in a selected rotational position.

In accordance with still another aspect, a method for forming an ophthalmic lens is provided. More particularly, in accordance with this aspect, an injection molding apparatus is provided having a non-optical tool assembly for forming a non-optical surface of an ophthalmic lens mold and an optical tool assembly in opposed relation to the non-optical tool assembly. The non-optical tool assembly and the optical tool assembly together form a mold cavity. The optical tool assembly includes a rotatably mounted core member and an optical insert removably secured to the core member. The optical insert has an asymmetric optical molding surface for forming an optical surface of the ophthalmic lens mold section opposite the non-optical surface. The ophthalmic lens mold section is injection molded in and then removed from the mold cavity. The ophthalmic lens mold is matched with a mating ophthalmic lens mold section to cast mold an ophthalmic lens therebetween.

DETAILED DESCRIPTION

Figure 1:
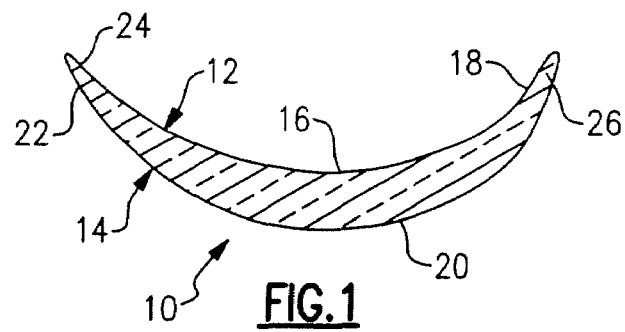
FIG. 1 is schematic cross-sectional view of a representative ophthalmic lens having an asymmetric surface.

Referring now to the drawings wherein the showings are for purposes of illustrating one or more embodiments and not for purposes of limiting the same, a representative ophthalmic lens having a rotationally asymmetric surface is shown in FIG. 1 and generally designated by reference numeral 10. In the illustrated embodiment, lens 10 is a back-surface toric contact lens. However, as will be appreciated by those skilled in the art, the lens 10 could be any other ophthalmic lens having at least one rotationally asymmetric surface, such as an alternating vision multifocal contact lens for example. As used herein, the term "rotationally asymmetric surface" denotes a surface that is not a second-order surface of revolution, such as a torus section.

The representative lens 10 includes a posterior surface 12 and an anterior surface 14. The posterior surface 12 has a central section or zone 16 that is toric, i.e., the central zone 16 has a toric surface on either or both the anterior and posterior surfaces that provides a desired cylindrical correction for use on one's cornea. The posterior surface 12 optionally includes at least one peripheral curve 18 surrounding the central toric zone 16. The anterior surface 14 has a central section or zone 20 that is spherical and generally matched or corresponding to the central zone 16 of the posterior surface 12 to provide a desired spherical correction to the lens 10. The anterior surface also has at least one peripheral curve 22 surrounding the central zone 20.

The lens 10 additionally includes a means for rotationally positioning or orienting the lens on one's cornea. In the illustrated embodiment, the means for rotationally positioning the lens is a ballast provided in the lens. Specifically, a peripheral section 24 has a different thickness than an opposed peripheral section 26 of the lens periphery due primarily to the inclusion of the ballast in the anterior surface 14. As a result of the ballast, the anterior surface 14 is not rotationally symmetric (i.e., the surface 14 is rotationally asymmetric). Other means for rotationally positioning the lens are known to those skilled in the art, including for example other ballast types, thin zones, etc., and can alternately be employed in the lens 10. Possibly further contributing to the surface 14 being rotationally asymmetric is the acceptable misalignment of the central zone and, more particularly, a centerpoint of the zone 20 relative to a center of the lens 10 (i.e., the centerpoint of the zone 20 need not necessarily be aligned with the geometric center of the lens).

Figure 2:
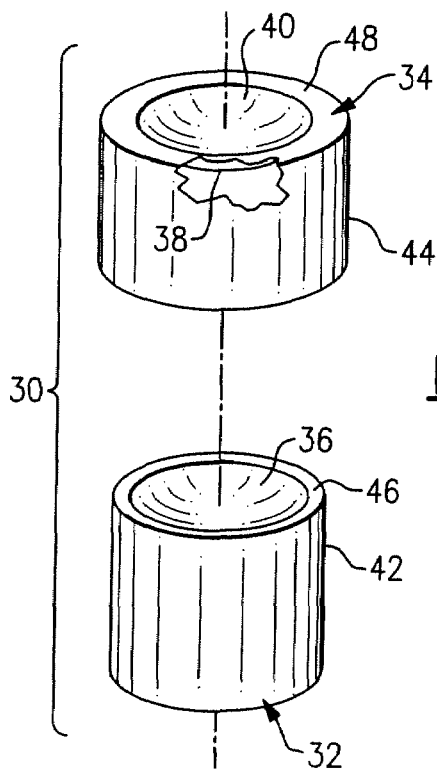
FIG. 2 is a schematic cross-sectional view of a representative mold section assembly for making the ophthalmic lens of FIG. 1.

With additional reference to FIG. 2, a representative mold assembly 30 for forming the lens 10 is shown. The mold assembly 30 includes an anterior mold preform or section 32 and a posterior mold preform or section 34. When mold sections 32 and 34 are assembled, optical surfaces 36, 38 of the mold sections 32, 34 define a mold cavity in which the ophthalmic lens 10 is formed, such as by cast molding. More specifically, the optical surface 36, also referred to herein as an anterior molding surface, is a concave surface that forms the central zone 20 and has a configuration that will provide ballast to the lens 10. The optical surface 38, also referred to herein as a posterior molding surface, is a convex surface formed opposite non-optical surface 40 that includes a toric zone for forming the toric posterior surface 12 of the toric lens 10. Of course, surfaces 36, 38 can also include curves for forming desired peripheral curves on the lens 10 and the surfaces 36, 38 can be designed to provide a desired spherical correction to the molded toric lens 10. In the illustrated mold assembly 30, mold sections 32 and 34 additionally include respective cylindrical walls 42, 44 and segment walls 46, 48 that nest (without necessarily touching or contacting one another) when the mold sections are fully assembled.

As will be described in more detail below, each of the mold sections 32, 34, also referred to herein as ophthalmic lens mold sections, can be injection molded from a plastic resin, such as, for example, polypropylene, polyvinyl chloride (PVC) or polystyrene, in a full injection molding apparatus. As will be understood by those skilled in the art, the injection molded sections 32, 34 can then be used in a cast molding process wherein a curable lens material, such as a liquid polymerizable monomer mixture, is introduced onto anterior molding surface 36, mold sections 32, 34 are brought into close association with the liquid being compressed to fill the mold cavity formed between the sections 32, 34, and the monomer mixture is cured into an ophthalmic lens, such as toric contact lens 10 shown in the illustrated embodiment. It should be readily appreciated by those skilled in the art that slightly modified mold sections could be formed and applied in the above-described cast molding process.

As will be understood by those skilled in the art, tools assemblies are mounted in the injection molding apparatus for forming the mold sections 32, 34 by injection molding. The tool assemblies are mounted to and/or fitted into mold plates of the injection molding apparatus and the mold sections 32, 34 are formed by injection molding a selected resin in a cavity formed between opposed sets of tool assemblies. With additional reference to FIG. 3, only tool assemblies for forming the posterior mold section 34 will be described in further detail herein. However, it is to be appreciated by those skilled in the art that the embodiment or embodiments discussed herein are easily adaptable for formation of the anterior mold section and both are considered within the scope of the invention both individually and collectively. Furthermore, as stated above in the Summary section hereof, it is noted that although the preferred embodiment described herein associates the optical tool assembly with the selectively rotatable core member, it will be apparent to those skilled in the art that the rotatable core member and associated components thereof may alternately be used on the non-optical tool side of the injection mold base.

Figure 3:
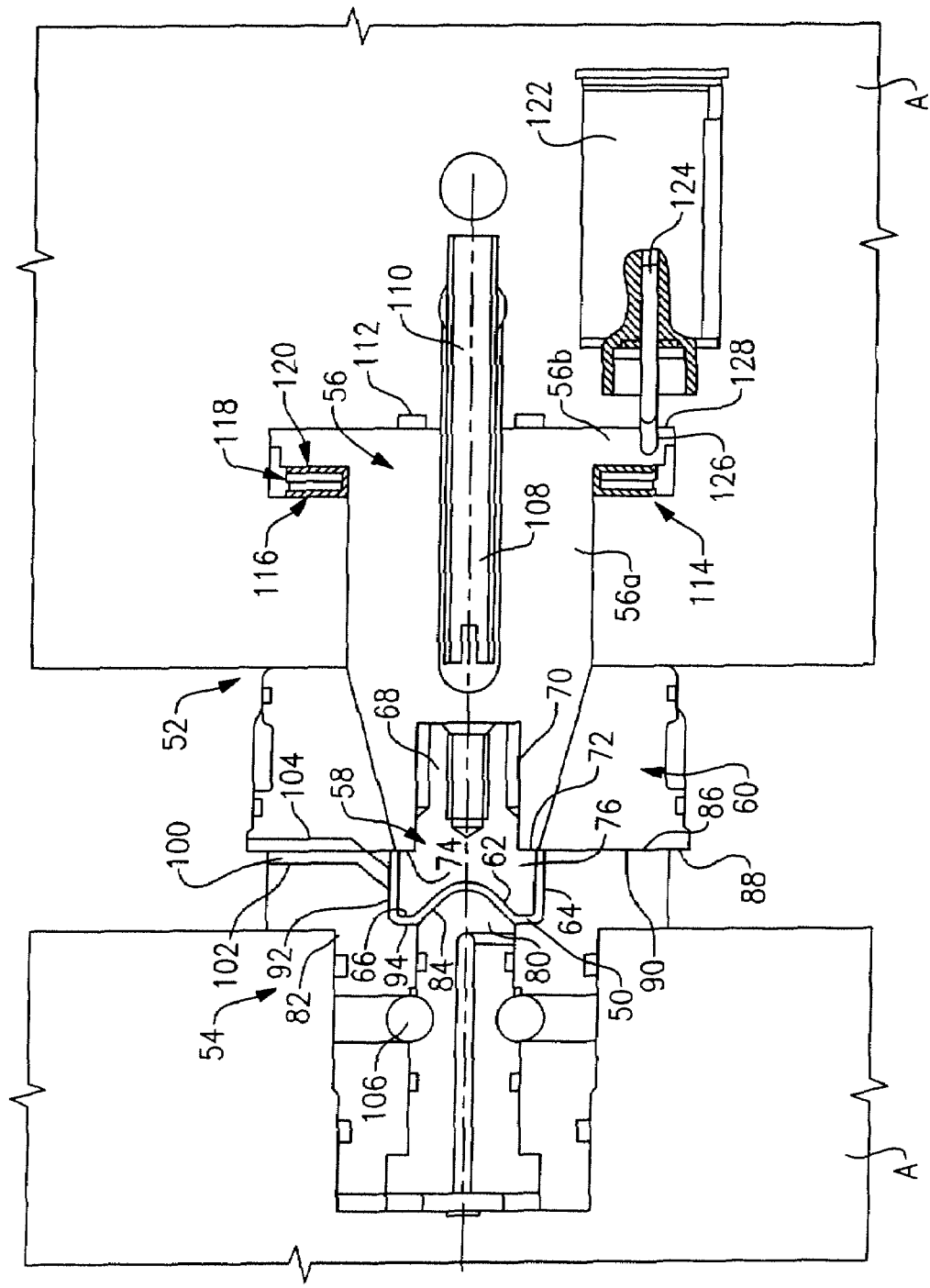
FIG. 3 is a schematic cross-sectional view of an injection molding arrangement having tooling (including an optical tool assembly and a non-optical tool assembly) for injection molding an anterior mold section of the mold assembly shown in FIG. 2.

In FIG. 3, a mold cavity 50 is formed between opposed tool assemblies of an injection molding apparatus A, including optical tool assembly 52 and non-optical tool assembly 54, in which the mold section 34 of FIG. 2 can be formed by injection molding. As illustrated, the optical tool assembly 52 forms the optical surface 38 of the mold section 34 and the non-optical tool assembly 54 forms the non-optical surface 40 on an opposite side of the surface 38. The tool assemblies 52, 54 also combine to form the cylindrical wall 44 and the segment wall 48 of the mold section 34.

The optical tool assembly 52 includes a core member 56 rotatably mounted to an associated first mold plate of the injection molding apparatus A, an optical insert 58 removably secured to the core member and a stripper member 60 (which can be a stripper plate or sleeve, for example) annularly received about the core member. The optical insert 58 includes optical molding surface 62 which has an optical quality finish to form the posterior molding optical surface 38. The molding surface 62 is an asymmetrical molding surface shaped to form the asymmetrical posterior mold surface 38 of the posterior mold section 34. As used herein, the term "optical quality finish" denotes a molding surface that is sufficiently smooth for forming optical surface 38 which ultimately forms the posterior surface 12 of the ophthalmic lens 10, e.g., the produced lens is suitable for placement in the eye without the need to machine or polish the formed lens surface. The insert 58 additionally includes molding surfaces 64, 66 that form, respectively, an inner surface of the cylindrical wall 44 and an inner surface of the segment wall 48.

Specifically, the insert 58 includes a threaded shaft portion 68 received and threadedly engaged within a bore 70 defined in a distal end 72 of the core member 56. A shoulder 74 of the insert 58 disposed between the shaft portion 68 and a head portion 76 abuts the distal end 72 of the core member 56 when the insert is fully threadedly received in the bore 70. As will be described in more detail below, the core member 56 is rotatably secured to the injection molding apparatus A. Additionally, as will be appreciated and understood by those skilled in the art, the insert 58 can include tool engaging flats (not shown) for ease of installation and removal, and the head portion 76 can include retaining ribs (not shown) for retaining the molded posterior section 34 on the insert 58 when the tooling assemblies 52, 54 are separated after injection molding. As is known and understood by those skilled in the art, the stripper member 60, which is mounted for movement relative to the injection molding apparatus A, is used to remove the molded molding section 34 from the insert 58 after the tooling assemblies 32, 34 are separated by advancing in the direction of the tooling assembly 54 (i.e., to the left in FIG. 2) and forcibly separating the molding section 34 from the insert 58 and its retaining ribs.

The core member 56, optical insert 58 and the stripper member 60 can be formed, for example, of brass, stainless steel, nickel or some combination thereof. Alternately, the core member 56 can be formed of a material which has enhanced heat transfer characteristics, such as beryllium copper (BeCu), for example, and the insert can formed of a material that is more desirable than BeCu from an environmental/biohazard standpoint to machine, such as copper, nickel or tin alloys. The molding surfaces 62, 64, 66 of the optical insert 58 can be formed according to methods generally known to those skilled in the art, such as for example lathe cutting or electrodischarge machining. The optical molding surface 62 can additionally be polished to achieve precision surface quality so that no, or only insignificant, surface imperfections are transferred to the mold section 34.

The non-optical tooling assembly 54 includes a non-optical tool 80 mounted within a waterjacket 82 and both secured to an associated second mold plate of the injection molding apparatus A. The non-optical tool 80 includes a non-optical molding surface 84 for forming the non-optical surface 40 of the posterior mold section 34. The water jacket 82 includes a mating surface 86 which abuts or engages a corresponding mating surface 88 of the stripper member 60 along a parting line 90 to form the closed mold cavity 50. The water jacket 82 further includes molding surfaces 92, 94 that form, respectively, an outer surface of the cylindrical wall 44 and an outer surface of the segment wall 48. As known and understood by those skilled in the art, the non-optical tool 80 and the water jacket 82 can both be conventionally secured to the injection molding apparatus A. Of course, as would be apparent to one skilled in the art, the exact design or configuration to accommodate the tooling assembly 54 and its components, as well as the tool assembly 52 and its components, will depend on the specific injection molding apparatus used.

The non-optical insert 80 and the waterjacket 82 can be formed, for example, of brass, stainless steel, nickel or some combination thereof. Alternately, the waterjacket 82 can be formed of a material which has enhanced heat transfer characteristics, such as beryllium copper (BeCu), and the insert can formed of a material that is more desirable to machine than BeCu (see above), such as copper, nickel or tin alloys. In any case, the molding surfaces 84, 92, 94 can be formed according to methods generally known to those skilled in the art, such as for example lathe cutting or electrodischarge machining. Unlike the optical molding surface 62, the non-optical insert molding surface 84, used to form the non-optical surface 40, does not require an optical quality finish as it does not contact the polymerizable lens mixture in the casting process. Thus, the surface 84 does not require the same degree of polishing as the optical molding surface 62 which is used to form the optical surface 38. However, some polishing or grinding may still be required to form the surface 84.

A runner or sprue 100 is disposed between the tooling assemblies 52, 54 and fluidly connected to the cavity 50 for allowing molten resin to be injected into the cavity when injection molding the mold section 34. In the illustrated embodiment, the runner 100 connects to the cavity 50 along a portion thereof that forms the cylindrical wall 44 and thereby does not interfere with the molding of the optical surface 38. The runner 100 is formed by a first channel 102 defined in the water jacket 82 and a second channel 104 defined in the stripper member 60, which is aligned with the first channel 102. The water jacket 82 can additionally include a vent (not shown) for allowing air trapped in the mold cavity 50 to escape during injection molding of the mold section 34.

For cooling purposes, the water jacket 82 includes a cooling passage 106 into which a cooling medium or fluid, such as water, can be injected or directed from cooling lines (not shown) on the injection molding apparatus A for cooling the molded molding section 34 after injection molding. Likewise, the core member 56 includes a cooling cavity 108 spaced from the bore 70. The cooling cavity 108 is fluidly connected to a cooling passage 110 of the injection molding apparatus A. An O-ring seal 112 is provided annularly about the passage 110 for sealing between the injection molding apparatus and the rotatably mounted core member 56 and preventing leakage of the cooling medium therebetween. The cooling medium of the injection molding apparatus A can be directed into the passage 110 which is fluidly connected to the cavity 108 for additionally cooling the molded molding section 34 after injection molding. Together, the passage 106 and the opposed cavity 108 can cooperate to provide balanced cooling (i.e., cooling to both sides) to molding sections, such as molding section 34, formed in the cavity 50.

As already indicated, the core member 56 is rotatably mounted to the injection molding apparatus A enabling the core member 56 to be rotatably moved relative to the injection molding apparatus. To facilitate rotation of the core member 56 relative to the molding apparatus A, a roller bearing assembly 114 is annularly received about a body portion 56a of the core member 56 and adjacent a radially extending flange portion 56b of the core member. Specifically, the roller bearing assembly 114 is positioned forward of the flange portion 56b (in the direction of the optical insert 58) and between the flange portion 56b and the injection molding apparatus A.

The roller bearing assembly 114 includes a first washer 116, a thrust bearing 118 and a second washer 120. In the illustrated embodiment, the thrust bearing 118 is sandwiched between the first and second washers 116, 120. The presence of the roller bearing assembly 114 aids in the ease of rotation of the core member 56 relative to the molding apparatus A. Rotation of the core member 56 allows rotational positioning of the optical insert 58, when connected to the core member 56, relative to the molding apparatus A, which enables rotational positioning of the asymmetric molding surface 62 disposed thereon relative to the molding apparatus A.

Figure 4:
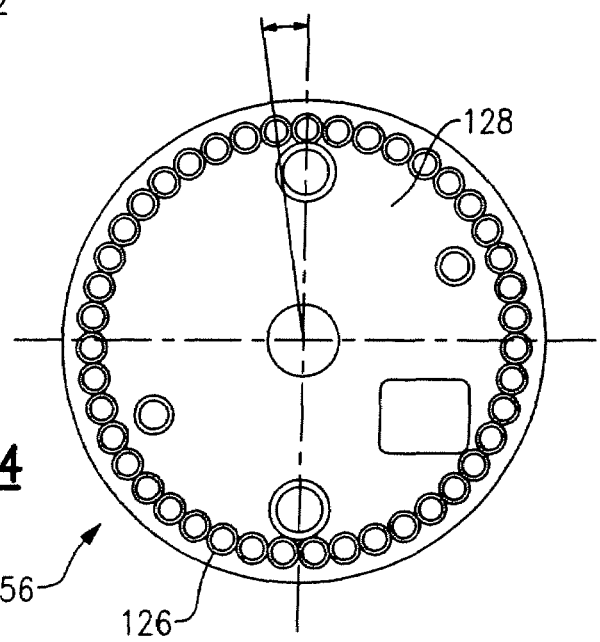
FIG. 4 is a schematic plan view of a core member of the optical tool assembly of FIG. 3.

A rotational locking means is provided on the injection molding apparatus A for selectively locking the rotational position of the core member 56 relative to the molding apparatus. In the illustrated embodiment, with reference to FIGS. 3 and 4, the rotational locking means includes a locking mechanism 122 having a selectively movable locking pin 124 and a plurality of circumferentially spaced holes 126 disposed on the core member 56. The locking mechanism is mounted to the molding apparatus A and the plurality of circumferentially spaced holes 126 are positioned to be selectively alignable with the locking pin 124 for receipt thereof to rotatably lock the core member.

More particularly, the holes 126 are defined in a proximal end 128 of the core member 56 and are radially positioned so as to be alignable with the pin 124 as the core member 56 is rotated. The pin 124 is moveable between a first or retracted position wherein the core member 56 is allowed to freely rotate and a second or normally, engaged position wherein the pin 124 is received in one of the holes 126 for rotatably locking the core member 56. The locking mechanism 124 can include a solenoid for controlling the position of the pin 124 and a bias mechanism, such as a spring (not shown), for urging the pin toward the engaged position. In this configuration, the locking mechanism 124 normally urges the pin 124 into the engaged or locked position (i.e., into one of the aligned holes 126) to retain the core member 56 in a constant rotational orientation and, when actuated, the locking mechanism moves or retracts the pin to the retracted position to allow the core member 56 to be rotated to a specific, desired rotational orientation. In the illustrated embodiment, the circumferential space between adjacent holes 126 is such that the pin 124 will enter one of the holes 126, even if the entered hole is not precisely aligned with the pin 124, and thereby align the pin with the entered hole.

As will be appreciated by those skilled in the art, the locking mechanism 124 can be configured to communicate with the injection molding apparatus A for purposes of indicating the status of the locking pin 124 (i.e., in the engaged position or in the retracted position). In one embodiment, communication can occur through an electrical feed and/or to controls of the injection molding apparatus A. The communicated status of the locking pin can be used to ensure that injection molding is not attempted when the pin is in the retracted position wherein the core member 56 is allowed to rotate.

In operation, the rotational locking means allows the insert 58 to be toggled between being rotatably fixed in a selected rotational position (i.e., when the pin 124 is received in a selected hole 126) and being rotatably moveable for movement to a selected rotational position (i.e., when the pin 124 is retracted). More specifically, the pin 124 is normally received in one of the holes 126 to rotatably lock the core member 56 in a desired and/or specific rotational orientation. The optical insert 58 can be more easily installed, removed and/or replaced when the core member 56 is rotatably locked, as it can be considerably more difficult, if not impossible, to install, remove or replace an optical insert in/from the core member 56 if the core member is free to rotate. Often, however, when installing an insert, such as optical insert 58, into the rotatably locked core member 56, the threaded connection therebetween leaves the rotational position of the insert 58 at a random rotational location relative to the core member 56 and the injection molding apparatus A.

Should the random rotational location of the insert 58 not be desirable, the solenoid in the locking mechanism 122 is actuated to retract the pin 124 and allow the core member 56 with the insert 58 secured thereto to be freely rotated. It can be desirable to rotate the core member 56 and insert 58 to rotatably position the asymmetric molding surface 76 of the insert 58. For example, in some applications, it is preferred to have the asymmetric molding surface 76 rotatably located in a desired position relative to the gate 100 because the flow dynamics of fluid mold material injected into the cavity 50 over asymmetric molding surface 76 varies depending on orientation of molding surface 76 relative to flow direction of fluid mold material emanating from gate 100 of the molding apparatus A.

With the pin 124 retracted, the core member 56, and thereby the asymmetric surface 76, are rotatable to a selected position, such as a position wherein the surface 76 is desirably aligned with the gate 100. Once in the desired position, actuation of the solenoid is ceased which allows the spring of the locking mechanism 122 to urge the pin 124 forward and into the aligned or closest hole 126 thereby re-securing the core member 56 from rotational movement. The pin 124 remains in the selected hole 126 for continued rotational locking during injection molding of the mold section 34 in the cavity 50.

The exemplary embodiment has been described with reference to one or more embodiments. Obviously, modifications and alterations will occur to others upon reading and understanding the preceding detailed description. For example, other rotational locking mechanisms may be employed such as a clutch plate or other friction-type mechanism. Also, the locking pin may extend radially inward toward the core member or the core member may instead be provided with one or more retractable pins that engage selected holes or cooperating detents positioned thereabout. It is thus intended that the exemplary embodiment be construed as including all such modifications and alterations insofar as they come within the scope of the appended claims or the equivalents thereof.

The invention claimed is:

1. A method for forming an ophthalmic lens, comprising the steps of:
   providing an injection molding apparatus having a non-optical tool assembly for forming the non-optical surface of the ophthalmic lens mold section and an optical tool assembly in opposed relation to said non-optical tool assembly that together therewith forms a mold cavity for forming the ophthalmic lens mold section, said optical tool assembly includes a rotatably mounted core member; an optical insert removably secured to said core member, said optical insert having an optical molding surface for forming an optical surface of the ophthalmic lens mold section opposite the non-optical surface; and a locking mechanism selectively operable between an unlocked position and a locked position, wherein when in said unlocked position, said core member may be freely rotated, and when in said locked position said core member is in a selected rotatably fixed position;

injection molding said ophthalmic lens mold section in said mold cavity;

removing said molded ophthalmic lens mold section from said mold cavity;

matching said ophthalmic lens mold section with a mating ophthalmic lens mold section; and cast molding an ophthalmic lens between said ophthalmic lens mold sections.

2. The method of claim 1 wherein said locking mechanism includes a locking pin and circumferentially spaced holes defined in said core member for receipt of said locking pin when in said locked position.

3. The method of claim 2 wherein each of said holes is positioned to be selectively, individually alignable with said locking pin by rotating said core member when said locking mechanism is in said unlocked position.

4. The method of claim 2 wherein said holes are defined in a proximal end of said core member.

5. The method of claim 1 wherein said locking mechanism is a solenoid-actuated locking pin that spring biases said pin in an extended position wherein said pin may be received in a selected one of a plurality of circumferentially spaced holes defined in said core member and thereby lock said core member in a rotatably fixed position, and movable, upon actuation of said solenoid-actuated locking pin, to a retracted position to allow rotation of said core member to a selected rotational position.

6. The method of claim 1 wherein said locking mechanism communicates the position of said locking pin to an associated injection molding machine to prevent injection molding when said locking pin is in said first position.

7. The method of claim 1 and further including a roller bearing assembly disposed adjacent said rotatably mounted core assembly to facilitate rotation thereof.

8. The method of claim 1 wherein said optical molding surface is a rotationally asymmetric molding surface.

9. The method of claim 1 wherein said core member includes a bore having internal threads which are threadedly engaged to threads on said optical insert which is received in said bore.

10. The method of claim 9 wherein said core member defines a cooling cavity spaced from said bore into which a cooling fluid is directed from cooling lines.

11. The method of claim 1 wherein said optical tooling assembly further includes:

a stripper member annularly received about said core member and moveable toward said non-optical tool assembly for removing a molded ophthalmic lens mold section from said optical insert.

12. The method of claim 1 wherein said mold cavity is shaped to form the ophthalmic lens mold as one of a posterior lens mold or an anterior lens mold.

13. A method for forming an ophthalmic lens, comprising the steps of:

providing an injection molding apparatus for forming a mold section which is subsequently used for forming an ophthalmic lens having an asymmetric surface, said injection molding apparatus having a core member rotatably mounted to an associated first mold plate; an optical tool insert removably mounted to said core member, said optical tool insert having an asymmetric molding surface with an optical quality finish for forming an optical surface of the mold section; a locking mechanism mounted to the associated first mold plate to allow toggling of said core member with said optical tool insert mounted thereto between being a fixed, selected rotational position and an alternate selected rotational position; a non-optical tool mounted to an associated second mold plate opposite the associated first mold plate, said non-optical insert having a molding surface for forming a surface of the mold section opposite the optical surface; and a water jacket surrounding said non-optical tool and mounted to the associated second mold plate;

injection molding said ophthalmic lens mold section in said mold cavity;

removing said molded ophthalmic lens mold section from said mold cavity;

matching said ophthalmic lens mold section with a mating ophthalmic lens mold section; and cast molding an ophthalmic lens between said ophthalmic lens mold sections.

14. The method of claim 13 wherein said optical tool insert, said non-optical tool and said water jacket together form a mold cavity shaped to mold the mold section.

15. The method of claim 13 wherein said locking mechanism is a solenoid-actuated locking pin that is spring biased to an engaged position wherein said pin is received in one of a plurality of circumferentially spaced holes defined in said core member to rotatably lock said core member, and movable to a retracted position to allow rotation of said core member upon actuation of said solenoid-actuated locking pin.

16. The method of claim 13 wherein said water jacket and a stripper member annularly received about said core member and moveable toward said non-optical tool assembly for removing a molded ophthalmic lens mold from said optical insert together define a runner fluidly connected to said mold cavity for allowing molten resin to be injected into said mold cavity when injection molding the mold section.

17. The method of claim 13 wherein said core member is rotatable to align said asymmetric molding surface with a runner defined by at least one of said optical and non-optical tool assemblies.

18. A method for forming an ophthalmic lens, comprising the steps of:

providing an injection molding apparatus for forming a mold section which is subsequently used for forming an ophthalmic lens mold, said injection molding apparatus having a non-optical tool assembly for forming the non-optical surface of the ophthalmic lens mold; a rotatably mounted optical tool assembly in opposed relation to said non-optical tool assembly that together therewith forms a mold cavity for forming the ophthalmic lens mold, said optical tool assembly includes an asymmetric optical molding surface for forming an optical surface of the ophthalmic lens mold opposite the non-optical surface; and a locking mechanism having a locking pin selectively receivable in one of a plurality of circumferentially spaced holes defined in said rotatably mounted optical tool assembly to rotatably lock said optical tool assembly in a selected rotative position;

injection molding said ophthalmic lens mold section in said mold cavity;

removing said molded ophthalmic lens mold section from said mold cavity;

matching said ophthalmic lens mold section with a mating ophthalmic lens mold section; and cast molding an ophthalmic lens between said ophthalmic lens mold sections.

* * * * *